United States Patent
Seidel et al.

(10) Patent No.: US 9,637,632 B2
(45) Date of Patent: *May 2, 2017

(54) METHOD FOR THE PRODUCTION AND STABILIZATION OF IMPACT-MODIFIED POLYCARBONATE COMPOSITIONS USING DILUTED SOLUTIONS OF ACIDIC COMPOUNDS

(71) Applicant: Covestro Deutschland AG, Leverkusen (DE)

(72) Inventors: Andreas Seidel, Dormagen (DE); Hans-Juergen Thiem, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 329 days.

This patent is subject to a terminal disclaimer.

(21) Appl. No.: 14/353,827

(22) PCT Filed: Oct. 23, 2012

(86) PCT No.: PCT/EP2012/070981
§ 371 (c)(1),
(2) Date: Apr. 24, 2014

(87) PCT Pub. No.: WO2013/060685
PCT Pub. Date: May 2, 2013

(65) Prior Publication Data
US 2014/0275339 A1    Sep. 18, 2014

(30) Foreign Application Priority Data

Oct. 26, 2011 (EP) ..................... 11186663

(51) Int. Cl.
| | | |
|---|---|---|
| *C08J 3/20* | (2006.01) | |
| *C08L 69/00* | (2006.01) | |
| *C08L 67/02* | (2006.01) | |
| *C08J 3/22* | (2006.01) | |

(52) U.S. Cl.
CPC ................. *C08L 69/00* (2013.01); *C08J 3/22* (2013.01); *C08L 67/02* (2013.01); *C08J 2369/00* (2013.01); *C08J 2409/00* (2013.01); *C08J 2433/20* (2013.01)

(58) Field of Classification Search
CPC .. C08L 69/00; C08L 2201/02; C08L 2205/03; C08L 2205/06; C08K 3/36
See application file for complete search history.

(56) References Cited

U.S. PATENT DOCUMENTS

| | | | |
|---|---|---|---|
| 4,299,929 A | 11/1981 | Sakano et al. | |
| 8,680,201 B2 * | 3/2014 | Seidel ...................... | C08J 3/005 525/241 |
| 9,056,977 B2 * | 6/2015 | Seidel ...................... | C08K 3/36 |
| 2006/0287422 A1 | 12/2006 | Volkers et al. | |
| 2007/0135544 A1 * | 6/2007 | Seidel ...................... | C08L 51/04 524/284 |
| 2008/0258338 A1 * | 10/2008 | Seidel ................... | C08L 69/005 264/255 |
| 2010/0144938 A1 * | 6/2010 | Seidel ...................... | C08L 69/00 524/152 |
| 2010/0210789 A1 * | 8/2010 | Seidel ...................... | C08J 3/005 525/53 |
| 2013/0253114 A1 | 9/2013 | Seidel et al. | |

FOREIGN PATENT DOCUMENTS

| | | |
|---|---|---|
| EP | 0 549 205 A2 | 6/1993 |
| WO | 2007/065579 A1 | 6/2007 |

OTHER PUBLICATIONS

European Search Report of EP 11 18 6663 Dated Apr. 2, 2012.

* cited by examiner

*Primary Examiner* — Hannah Pak
(74) *Attorney, Agent, or Firm* — K&L Gates LLP

(57) ABSTRACT

The present invention relates to a process for the preparation of stabilized impact-modified polycarbonate compositions using dilute aqueous acidic solutions, and to the compositions so prepared themselves.

12 Claims, No Drawings

METHOD FOR THE PRODUCTION AND STABILIZATION OF IMPACT-MODIFIED POLYCARBONATE COMPOSITIONS USING DILUTED SOLUTIONS OF ACIDIC COMPOUNDS

CROSS REFERENCE TO RELATED APPLICATIONS

This application is a §371 National Stage Application of PCT/EP2012/070981, filed Oct. 23, 2012 which claims priority to EP 11186663.8, filed Oct. 26, 2011.

BACKGROUND

Field of the Invention

The present invention relates to a process for the preparation of stabilised impact-modified polycarbonate compositions using dilute solutions of acidic compounds, and to the compositions so prepared themselves.

Description of Related Art

The compounding process according to the invention permits the preparation of impact-modified polycarbonate compositions having an advantageous combination of hydrolytic stability and high processing stability, measured by streaking, polycarbonate molecular weight degradation, natural colour and gloss level stability and low-temperature notched impact strength, elongation at tear and stress cracking resistance under the influence of media, in each case considered on components that have been manufactured at high processing temperatures.

In the processing of polymers, compounding refers to the preparation of a finished plastics moulding composition, the compound, from optionally a plurality of polymeric raw materials with the optional addition of polymer additives such as, for example, fillers and reinforcing materials, adhesion promoters, lubricants, stabilisers, etc. Compounding takes place predominantly in kneaders or extruders and comprises the process operations of feeding, melting, dispersing, mixing, degassing and pressure build-up. Compounding is generally followed by solidification of the compound, which is effected by cooling, and granulation thereof.

Emulsion polymers, which are used in polycarbonate compositions as impact modifier, are generally worked up in an acidic medium for the purpose of neutralising polymerisation processing aids having a basic action, such as, for example, emulsifiers. This is necessary in order to ensure adequate heat stability of the compositions because, as is known, basic components tend to cause thermal degradation of the polycarbonate under processing temperatures.

It is often additionally necessary to stabilise polycarbonate compositions containing emulsion graft polymers as impact modifier by addition of acidic additives. That is the case in particular when emulsion graft polymers are used that have been worked up in a basic or insufficiently acidic medium.

Although such compositions known from the prior art generally have good processing stability, they exhibit unsatisfactory stability to hydrolytic cleavage of the polycarbonate under application conditions (for example at temperatures <100° C. and high humidity) and a poor (yellow) natural colour.

EP-A 900 827 describes impact-modified polycarbonate compositions which have improved heat stability and contain emulsion polymers which are substantially free of any basic components that degrade the polycarbonate. According to that application, such polycarbonate compositions impact-modified with emulsion polymers that contain basic impurities from their preparation exhibit unsatisfactory processing stability.

EP-A 576 950 A1 and WO-A 2007/065579 describe compositions containing polycarbonate and acrylonitrile-butadiene-styrene (ABS) polymers, which compositions contain basic impurities and are stabilised with multifunctional organic carboxylic acids. Such compositions have good heat stability with regard to the integrity of the molecular weight of the polycarbonate component at high processing temperatures, but surface defects (streaks) tend to form on the mouldings produced therefrom in injection moulding.

US2006/0287422 describes thermoplastic compositions containing polycarbonate, an impact modifier, optionally a vinyl copolymer, a mineral filler and an acid or an acidic salt, having improved mechanical properties and a reduced tendency to thermal degradation. The application discloses as preferred acids also phosphorus-based compounds of the general formula $H_mP_tO_n$, specifically inter alia also phosphoric acid. The application discloses that the compositions according to the invention can be prepared by processes described in the prior art.

In WO-A 2010/063381 there are described impact-modified polycarbonate compositions having an improved combination of hydrolytic and processing stability, which compositions contain polycarbonate, an emulsion graft polymer containing basic impurities, and an acidic phosphorus compound having at least one P—OH functionality. As acidic phosphorus compounds there are described both specific cyclic organophosphite compounds and inorganic or organic phosphorus compounds such as, for example, phosphoric acid or phosphoric acid esters.

EP 22 57 590 discloses polycarbonate compositions having an improved combination of natural colour, hydrolytic stability and processing stability, containing polycarbonate, rubber-modified graft polymer containing residues of a fatty acid salt emulsifier resulting from its preparation, wherein the graft polymer in aqueous dispersion has a pH value greater than 7, and an acidic additive. In that application, hydroxy-functionalised mono- and poly-carboxylic acids as well as phosphoric acid are disclosed as the acidic additive.

While it is known from the prior art to add, for example, acidic compounds such as citric acid or phosphoric acid, the use of such acids in polycarbonate compositions which have been prepared by processes described in the prior art frequently leads to disadvantages such as streaking at the surface of components produced from such compositions or pronounced molecular weight degradation as well as unsatisfactory mechanical properties.

None of the mentioned passages describes a process for the preparation of stabilised polycarbonate compositions according to the present invention.

SUMMARY

Accordingly, it was an object of the present invention to provide a process for the preparation of stabilised impact-modified polycarbonate compositions which do not have the above-mentioned disadvantages.

Surprisingly, it has been found that the desired property profile is exhibited by impact-modified polymer compositions prepared by the process according to the invention, comprising A from 10 to 98 parts by weight, preferably from 30 to 90 parts by weight, more preferably from 50 to 80 parts by weight, particularly preferably from 55 to 65 parts by weight, in each case based on the sum of components A+B+C+D+E, of at least one polymer selected from the group of the aromatic polycarbonates, aromatic polyester carbonates and aromatic polyesters, as well as mixtures thereof, B from 0.5 to 50.0 parts by weight, preferably from 1 to 30 parts by weight, more preferably from 1.5 to 20.0 parts by weight, particularly preferably from 1.5 to 5.0 parts by weight, in each case based on the sum of components A+B+C+D+E, of at least one pulverulent rubber-modified vinyl (co)polymer, C from 0 to 80 parts by weight, preferably from 10 to 60 parts by weight, more preferably from 15 to 50 parts by weight, particularly preferably from 20 to 40 parts by weight, in each case based on the sum of components A+B+C+D+E, of at least one component selected from rubber-modified vinyl (co)polymers in granulate form and rubber-free vinyl (co)polymers, D from 0.002 to 0.200 part by weight, preferably from 0.005 to 0.100 part by weight, more preferably from 0.005 to 0.050 part by weight, and particularly preferably from 0.007 to 0.020 part by weight, in each case based on the sum of components A+B+C+D+E, of at least one Brönsted acid, E from 0.1 to 40.0 parts by weight, preferably from 0.2 to 25.0 parts by weight, more preferably from 0.3 to 10.0 parts by weight, particularly preferably from 0.5 to 3.0 parts by weight, in each case based on the sum of components A+B+C+D+E, of additives, with the exception of the acids that are conventionally added, wherein all parts by weight in the present application are so normalised that the sum of the parts by weight of components A+B+C+D+E in the composition is 100, wherein in the process according to the invention (i) in a first process step, a solution of the acidic compound D having a concentration of from 0.3 to 30 wt. %, preferably from 0.5 to 15 wt. %, more preferably from 0.5 to 8 wt. %, in particular from 1 to 6 wt. %, is prepared, (ii) in a second process step, that solution of the acidic compound D is physically blended with the total amount or a partial amount of the graft polymer powder according to component B and optionally with the total amount or a partial amount of one or more further pulverulent components of the polycarbonate-ABS composition, and (iii) the mixture so prepared, together with the further residual components A-E of the composition, which have optionally likewise been premixed, is melted, mixed and dispersed in one another in a compounding unit, wherein the solvent that has been added to the composition by the solution of the acidic compound is removed again in a degassing zone of the compounding unit by application of a low pressure, and the polymer melt so prepared is subsequently solidified by cooling and granulated.

DETAILED DESCRIPTION OF A PREFERRED EMBODIMENT

In a preferred embodiment, in step (ii), in addition to component D, further stabilisers according to component E are also mixed with component B.

In a particularly preferred embodiment, in step (ii), apart from component D and optionally further stabilisers according to component E, no further polymeric components of the composition are mixed with component B.

In a further preferred embodiment, component B and the solution of the acidic compound from process step (i) are first mixed in step (ii), before further pulverulent components are added.

Where the amount of component B is more than 10 parts by weight, based on the total composition, preferably only a partial amount of B is used in step (ii), particularly preferably a partial amount of from 1.5 to 5.0 parts by weight.

As solvent in step (i) there can be used both organic and inorganic solvents, inorganic solvents being preferred.

In a particularly preferred embodiment, the solvent in step (i) is water.

In a further preferred embodiment, the solution of component D is used in the mixture prepared in step (ii) in an amount, based on the sum of components B and D in that mixture, of not more than 30 parts by weight, particularly preferably not more than 20 parts by weight, in particular from 10 to 20 parts by weight. In a preferred embodiment, the mixture resulting from step (ii), together with the total amounts of components A to E or the partial amounts thereof remaining after step (ii), is heated to a temperature of from 200° C. to 350° C., preferably from 220° C. to 320° C., particularly preferably from 240° C. to 300° C., in a compounding unit by the supply of thermal energy and/or mechanical energy, and thereby melted, mixed, dispersed in one another and subsequently degassed in a degassing zone of the compounding unit, wherein the compounding unit has a melting zone and a mixing zone or a combined melting and mixing zone, wherein all or optionally in each case part of the mixture resulting from step (ii), together with the residual amounts of components A to D of the composition, can be metered into the compounding unit into a zone, referred to hereinbelow as the intake zone, upstream of the melting zone, or alternatively into a zone downstream of the melting zone directly into the premixed melt of the components of the composition metered into the intake zone of the compounding unit, wherein an absolute pressure $p_{abs}$ of not more than 800 mbar, preferably not more than 500 mbar, particularly preferably not more than 200 mbar, is established in the degassing zone of the compounding unit, wherein the mean residence time for which the melt of the composition is in contact with the solvent introduced into the process by way of the mixture prepared in process step (ii) is limited preferably to a maximum of 90 seconds, particularly preferably to a maximum of 60 seconds, most particularly preferably to a maximum of 30 seconds, and the resulting melt is solidified again by cooling on leaving the compounding unit.

Within the scope of the invention, "powder" or "pulverulent" is understood as meaning a component or a mixture of a plurality of components which is present in the solid state of aggregation and in which the particles have particle sizes of less than 2 mm, preferably of less than 1 mm, in particular of less than 0.5 mm.

Within the scope of the invention, "granulate" is understood as meaning a component or a mixture of a plurality of components which is present in the solid state of aggregation, wherein the solid particles have a particle size of at least 2 mm and generally not more than 10 mm. The granulate grains can have any desired shape, for example a lenticular shape, a spherical shape or a cylindrical shape.

Component A

Aromatic polycarbonates according to component A that are suitable according to the invention are known in the literature or can be prepared by processes known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see e.g. DE-A 3 077 934).

The preparation of aromatic polycarbonates is carried out, for example, by reaction of diphenols with carbonic acid halides, preferably phosgene, and/or with aromatic dicarboxylic acid dihalides, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerisation process by reaction of diphenols with, for example, diphenyl carbonate is also possible.

Diphenols for the preparation of the aromatic polycarbonates and/or aromatic polyester carbonates are preferably those of formula (I)

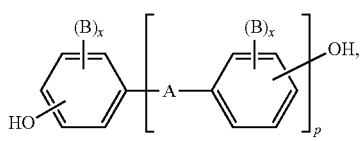

(I)

wherein
A is a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which further aromatic rings optionally containing heteroatoms can be fused,
or a radical of formula (II) or (III)

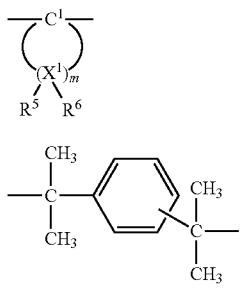

B is in each case $C_1$- to $C_{12}$-alkyl, preferably methyl, halogen, preferably chlorine and/or bromine,
x each independently of the other is 0, 1 or 2,
p is 1 or 0, and
$R^5$ and $R^6$ can be chosen individually for each $X^1$ and each independently of the other is hydrogen or $C_1$- to $C_6$-alkyl, preferably hydrogen, methyl or ethyl,
$X^1$ is carbon and
m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxy-phenyl) sulfoxides, bis-(hydroxyphenyl) ketones, bis-(hydroxyphenyl)-sulfones and α,α-bis-(hydroxyphenyl)-diisopropyl-benzenes, and derivatives thereof brominated and/or chlorinated on the ring.

Particularly preferred diphenols are 4,4'-dihydroxydiphenyl, bisphenol A, 2,4-bis(4-hydroxy-phenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenylsulfone and di- and tetra-brominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols can be used on their own or in the form of arbitrary mixtures. The diphenols are known in the literature or are obtainable according to processes known in the literature.

Chain terminators suitable for the preparation of thermoplastic aromatic polycarbonates are, for example, phenol, p-chlorophenol, p-tert-butylphenol or 2,4,6-tribromophenol, but also long-chained alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates have mean weight-average molecular weights ($M_w$, measured, for example, by GPC, ultracentrifuge or scattered light measurement) of from 10,000 to 200,000 g/mol, preferably from 15,000 to 80,000 g/mol, particularly preferably from 24,000 to 32,000 g/mol.

The thermoplastic aromatic polycarbonates can be branched in a known manner, preferably by the incorporation of from 0.05 to 2.0 mol %, based on the sum of the diphenols used, of compounds having a functionality of three or more than three, for example those having three or more phenolic groups.

Both homopolycarbonates and copolycarbonates are suitable. For the preparation of copolycarbonates of component A according to the invention it is also possible to use from 1 to 25 wt. %, preferably from 2.5 to 25 wt. %, based on the total amount of diphenols to be used, of polydiorganosiloxanes having hydroxyaryloxy end groups. These are known (U.S. Pat. No. 3,419,634) and can be prepared according to processes known in the literature. The preparation of copolycarbonates containing polydiorganosiloxanes is described in DE-A 3 334 782.

Preferred polycarbonates in addition to the bisphenol A homopolycarbonates are the copolycarbonates of bisphenol A with up to 15 mol %, based on the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Mixtures of the diacid dichlorides of isophthalic acid and terephthalic acid in a ratio of from 1:20 to 20:1 are particularly preferred.

In the preparation of polyester carbonates, a carbonic acid halide, preferably phosgene, is additionally used concomitantly as bifunctional acid derivative.

Suitable chain terminators for the preparation of the aromatic polyester carbonates, in addition to the monophenols already mentioned, are also the chlorocarbonic acid esters thereof and the acid chlorides of aromatic monocarboxylic acids, which can optionally be substituted by $C_1$- to $C_{22}$-alkyl groups or by halogen atoms, as well as aliphatic $C_2$- to $C_{22}$-monocarboxylic acid chlorides.

The amount of chain terminators is in each case from 0.1 to 10 mol %, based in the case of phenolic chain terminators on moles of diphenol and in the case of monocarboxylic acid chloride chain terminators on moles of dicarboxylic acid dichloride.

The aromatic polyester carbonates can also contain aromatic hydroxycarboxylic acids incorporated therein.

The aromatic polyester carbonates can be both linear and branched in known manner (see in this connection DE-A 2 940 024 and DE-A 3 007 934).

There can be used as branching agents, for example, carboxylic acid chlorides having a functionality of three or more, such as trimesic acid trichloride, cyanuric acid trichloride, 3,3'-, 4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol %, based on diphenols used. Phenolic branching agents can be placed in a reaction vessel with the diphenols; acid chloride branching agents can be introduced together with the acid dichlorides.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks or distributed randomly.

The relative solution viscosity ($\eta_{rel}$) of the aromatic polycarbonates and polyester carbonates is in the range of from 1.18 to 1.4, preferably from 1.20 to 1.32 (measured on solutions of 0.5 g of polycarbonate or polyester carbonate in 100 ml of methylene chloride solution at 25° C.).

In a preferred embodiment, the aromatic polyesters that are suitable according to the invention as component A are reaction products of aromatic dicarboxylic acids or reactive derivatives thereof, such as dimethyl esters or anhydrides, and aliphatic, cycloaliphatic or araliphatic diols, and mixtures of those reaction products.

Particularly preferred aromatic polyesters contain at least 80 wt. %, preferably at least 90 wt. %, based on the dicarboxylic acid component, of terephthalic acid radicals and at least 80 wt. %, preferably at least 90 mol %, based on the diol component, of ethylene glycol and/or 1,4-butanediol radicals.

As well as containing terephthalic acid radicals, the preferred aromatic polyesters can contain up to 20 mol %, preferably up to 10 mol %, of radicals of other aromatic or cycloaliphatic dicarboxylic acids having from 8 to 14 carbon atoms or of aliphatic dicarboxylic acids having from 4 to 12 carbon atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

As well as containing ethylene glycol and/or 1,4-butanediol radicals, the preferred aromatic polyesters can contain up to 20 mol %, preferably up to 10 mol %, of other aliphatic diols having from 3 to 12 carbon atoms or of cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-β-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxy-propoxyphenyl)-propane (DE-A 2 407 674, 2 407 776, 2 715 932).

The aromatic polyesters can be branched by the incorporation of relatively small amounts of tri- or tetra-hydric alcohols or tri- or tetra-basic carboxylic acids, for example according to DE-A 1 900 270 and U.S. Pat. No. 3,692,744. Examples of preferred branching agents are trimesic acid, trimellitic acid, trimethylol-ethane and -propane and pentaerythritol.

Particular preference is given to aromatic polyesters that have been prepared solely from terephthalic acid and reactive derivatives thereof (e.g. dialkyl esters thereof) and ethylene glycol and/or 1,4-butanediol, and to mixtures of such polyalkylene terephthalates.

Mixtures of polyalkylene terephthalates contain from 1 to 50 wt. %, preferably from 1 to 30 wt. %, polyethylene terephthalate and from 50 to 99 wt. %, preferably from 70 to 99 wt. %, polybutylene terephthalate.

The aromatic polyesters that are preferably used generally have a limiting viscosity of from 0.4 to 1.5 dl/g, preferably from 0.5 to 1.2 dl/g, measured in phenol/o-dichlorobenzene (1:1 parts by weight) at 25° C. in an Ubbelohde viscometer.

The aromatic polyesters can be prepared by known methods (see e.g. Kunststoff-Handbuch, Volume VIII, p. 695 ff, Carl-Hanser-Verlag, Munich 1973).

Component A can be used in the form of a powder and/or granulate.

Component B

Component B is a pulverulent graft polymer or a mixture of a plurality of pulverulent graft polymers. Graft polymers preferably used as component B comprise one or more graft polymers of B.1 from 5 to 95 wt. %, preferably from 20 to 90 wt. %, in particular from 25 to 50 wt. %, based on component B, of at least one vinyl monomer on B.2 from 95 to 5 wt. %, preferably from 80 to 10 wt. %, in particular from 75 to 50 wt. %, based on component B, of one or more rubber-like graft bases, wherein the glass transition temperatures of the graft bases are preferably <10° C., more preferably <0° C., particularly preferably <−20° C.

The glass transition temperatures are determined by means of differential scanning calorimetry (DSC) according to standard DIN EN 61006 at a heating rate of 10 K/min. with definition of the $T_g$ as the mid-point temperature (tangent method).

The graft base B.2 generally has a mean particle size ($d_{50}$ value) of from 0.05 to 10 μm, preferably from 0.1 to 2 μm, particularly preferably from 0.15 to 0.6 μm.

The mean particle size $d_{50}$ is the diameter above and below which in each case 50 wt. % of the particles lie. It can be determined by ultracentrifuge measurement (W. Scholtan, H. Lange, Kolloid, Z. and Z. Polymere 250 (1972), 782-1796).

Monomers B.1 are preferably mixtures of

B.1.1 from 50 to 99 parts by weight, preferably from 60 to 80 parts by weight, in particular from 70 to 80 parts by weight, based on B.1, of vinyl aromatic compounds and/or vinyl aromatic compounds substituted on the ring (such as styrene, α-methylstyrene, p-methylstyrene, p-chlorostyrene) and/or methacrylic acid ($C_1$-$C_8$)-alkyl esters, such as methyl methacrylate, ethyl methacrylate, and B.1.2 from 1 to 50 parts by weight, preferably from 20 to 40 parts by weight, in particular from 20 to 30 parts by weight, based on B.1, of vinyl cyanides (unsaturated nitriles such as acrylonitrile and methacrylonitrile) and/or (meth)acrylic acid ($C_1$-$C_8$)-alkyl esters, such as methyl methacrylate, n-butyl acrylate, tert-butyl acrylate, and/or derivatives (such as anhydrides and imides) of unsaturated carboxylic acids, for example maleic anhydride and N-phenyl-maleimide.

Preferred monomers B.1.1 are selected from at least one of the monomers styrene, α-methylstyrene and methyl methacrylate, and preferred monomers B.1.2 are selected from at least one of the monomers acrylonitrile, maleic anhydride and methyl methacrylate. Particularly preferred monomers are B.1.1 styrene and B.1.2 acrylonitrile.

Graft bases B.2 suitable for the graft polymers B are, for example, diene rubbers, EP(D)M rubbers, that is to say those based on ethylene/propylene and optionally diene, acrylate, polyurethane, silicone, chloroprene and ethylene/vinyl acetate rubbers, as well as silicone/acrylate composite rubbers.

Preferred graft bases B.2 are diene rubbers, for example based on butadiene and isoprene, or mixtures of diene rubbers or copolymers of diene rubbers or mixtures thereof with further copolymerisable monomers (e.g. according to B.1.1 and B.1.2).

Pure polybutadiene rubber is particularly preferred.

Particularly preferred polymers B are, for example, ABS or MBS polymers (emulsion, mass and suspension ABS), as are described, for example, in DE-OS 2 035 390 (=U.S. Pat. No. 3,644,574) or in DE-OS 2 248 242 (=GB-PS 1 409 275) or in Ullmanns, Enzyklopadie der Technischen Chemie, Vol. 19 (1980), p. 280 ff.

The graft copolymers B are prepared by radical polymerisation, for example by emulsion, suspension, solution or mass polymerisation, preferably by emulsion polymerisation.

Particularly suitable graft polymers B have a core-shell structure.

The gel content of the graft base B.2, in the case of graft polymers prepared by emulsion polymerisation, is at least 30 wt. %, preferably at least 40 wt. % (measured in toluene).

The gel content of the graft base B.2, or of the graft polymers B, is determined at 25° C. in a suitable solvent as the portion insoluble in those solvents (M. Hoffmann, H. Kromer, R. Kuhn, Polymeranalytik I and II, Georg Thieme-Verlag, Stuttgart 1977).

Particularly suitable graft rubbers are also ABS polymers, which are prepared by redox initiation with an initiator system of organic hydroperoxide and ascorbic acid according to U.S. Pat. No. 4,937,285.

Because, as is known, the graft monomers are not necessarily grafted completely onto the graft base in the graft reaction, graft polymers B are also understood according to the invention as being products that are obtained by (co)polymerisation of the graft monomers in the presence of the graft base and are obtained concomitantly on working up. Such products can accordingly also contain free (co)polymer of the graft monomers, that is to say (co)polymer that is not chemically bonded to the rubber.

Suitable acrylate rubbers according to B.2 are preferably polymers of acrylic acid alkyl esters, optionally with up to 40 wt. %, based on B.2, of other polymerisable, ethylenically unsaturated monomers. The preferred polymerisable acrylic acid esters include $C_1$- to $C_8$-alkyl esters, for example methyl, ethyl, butyl, n-octyl and 2-ethylhexyl ester; haloalkyl esters, preferably halo-$C_1$-$C_8$-alkyl esters, such as chloroethyl acrylate, as well as mixtures of those monomers.

For crosslinking, monomers having more than one polymerisable double bond can be copolymerised. Preferred examples of crosslinking monomers are esters of unsaturated monocarboxylic acids having from 3 to 8 carbon atoms and unsaturated monohydric alcohols having from 3 to 12 carbon atoms, or of saturated polyols having from 2 to 40H groups and from 2 to 20 carbon atoms, such as ethylene glycol dimethacrylate, allyl methacrylate; polyunsaturated heterocyclic compounds, such as trivinyl and triallyl cyanurate; polyfunctional vinyl compounds, such as di- and tri-vinylbenzenes; but also triallyl phosphate and diallyl phthalate. Preferred crosslinking monomers are allyl methacrylate, ethylene glycol dimethacrylate, diallyl phthalate and heterocyclic compounds which have at least three ethylenically unsaturated groups. Particularly preferred crosslinking monomers are the cyclic monomers triallyl cyanurate, triallyl isocyanurate, triacryloylhexahydro-s-triazine, triallylbenzenes. The amount of crosslinking monomers is preferably from 0.02 to 5 wt. %, in particular from 0.05 to 2 wt. %, based on the graft base B.2. In the case of cyclic crosslinking monomers having at least three ethylenically unsaturated groups, it is advantageous to limit the amount to less than 1 wt. % of the graft base B.2.

Preferred "other" polymerisable, ethylenically unsaturated monomers which can optionally be used, in addition to the acrylic acid esters, in the preparation of the graft base B.2 are, for example, acrylonitrile, styrene, α-methylstyrene, acrylamides, vinyl $C_1$-$C_6$-alkyl ethers, methyl methacrylate, butadiene. Preferred acrylate rubbers as graft base B.2 are emulsion polymers having a gel content of at least 60 wt. %.

Further suitable graft bases according to B.2 are silicone rubbers having graft-active sites, as are described in DE-OS 3 704 657, DE-OS 3 704 655, DE-OS 3 631 540 and DE-OS 3 631 539.

Component C

The rubber-free vinyl (co)polymers according to component C.1 are preferably rubber-free homo- and/or co-polymers of at least one monomer from the group of the vinyl aromatic compounds, vinyl cyanides (unsaturated nitriles), (meth)acrylic acid ($C_1$ to $C_8$)-alkyl esters, unsaturated carboxylic acids and derivatives (such as anhydrides and imides) of unsaturated carboxylic acids.

Particularly suitable are (co)polymers C.1 of

C.1.1 from 50 to 99 wt. %, preferably from 60 to 80, in particular from 70 to 80 wt. %, in each case based on the (co)polymer C.1, of at least one monomer selected from the group of the vinyl aromatic compounds (such as, for example, styrene, α-methylstyrene), vinyl aromatic compounds substituted on the ring (such as, for example, p-methylstyrene, p-chlorostyrene), and (meth)acrylic acid ($C_1$-$C_8$)-alkyl esters (such as, for example, methyl methacrylate, n-butyl acrylate, tert-butyl acrylate), and C.1.2 from 1 to 50 wt. %, preferably from 20 to 40, in particular from 20 to 30 wt. %, in each case based on the (co)polymer C.1, of at least one monomer selected from the group of the vinyl cyanides (such as, for example, unsaturated nitriles such as acrylonitrile and methacrylonitrile), (meth)acrylic acid ($C_1$-$C_8$)-alkyl esters (such as, for example, methyl methacrylate, n-butyl acrylate, tert-butyl acrylate), unsaturated carboxylic acids and derivatives of unsaturated carboxylic acids (for example maleic anhydride and N-phenyl-maleimide).

The (co)polymers C.1 are resin-like, thermoplastic and rubber-free. The copolymer of C.1.1 styrene and C.1.2 acrylonitrile is particularly preferred.

Such (co)polymers C.1 are known and can be prepared by radical polymerisation, in particular by emulsion, suspension, solution or mass polymerisation. The (co)polymers preferably have mean molecular weights M, (weight average, determined by GPC) of from 15,000 to 250,000 g/mol.

The rubber-free (co)polymers C.1 can be used in the form of a powder and/or in the form of a granulate.

The rubber-modified vinyl (co)polymers according to component C.2 are selected from at least one polymer of the group consisting of C.2.1 graft polymers in granulate form and C.2.2 precompounds in granulate form of at least two components selected from the group of the graft polymers C.2.2.1 and rubber free vinyl (co)polymers according to component C.1.

The graft polymers according to components C.2.1 and C.2.2.1 are in each case graft polymers which correspond to the description of component B in respect of the chemical structure and the preparation, components C.2.1 and C.2.2.1 differing from the description of component B, however, in that C.2.1 is graft polymers that are present in granulate form and C.2.2.1 are graft polymers that can be present in either granulate or powder form.

Within the scope of the invention, "precompound" is to be understood as meaning mixtures of graft polymers C.2.2.1 and rubber-free vinyl (co)polymers C.1 which have been heated to a temperature of from 180° C. to 300° C., preferably from 200° C. to 280° C., particularly preferably from 220° C. to 260° C., in a compounding unit, for example a kneading reactor or twin-shaft extruder, by the supply of thermal and/or mechanical energy, and thereby melted, mixed and dispersed in one another, and have subsequently been cooled again and granulated. In a preferred embodiment, the graft polymer C.2.2.1 is used in the moist state (i.e. in the presence of water) according to the processes described in EP 0 768 157 A1 and EP 0 867 463 A1.

Precompounds according to component C.2.2 contain preferably from 10 to 70 parts by weight, particularly preferably from 20 to 60 parts by weight, most particularly preferably from 25 to 55 parts by weight (in each case based on the precompound) of graft polymer C.2.2.1 and preferably from 30 to 90 parts by weight, particularly preferably from 40 to 80 parts by weight, most particularly preferably from 45 to 75 parts by weight (in each case based on the precompound) of rubber-free vinyl (co)polymer C.1.

Component D

As component D there is used at least one Brönsted-acidic compound of any kind.

The Brönsted-acidic compound is preferably an inorganic acid, more preferably a phosphoric acid compound, that is to say a compound having at least one POH functionality.

Examples of such compounds are ortho-phosphoric acid $P(O)(OH)_3$, phosphorous acid $HP(O)(OH)_2$, hypophosphorous acid $H_2P(O)(OH)$, organophosphorus compounds of phosphorous and hypophosphorous acid having the general formula $RP(O)(OH)_2$, $R(H)P(O)(OH)$ and $R(R')P(O)(OH)$, wherein R and R' independently of one another represent any desired optionally substituted alkyl, aryl or alkylaryl radical, as well as cyclic or linear oligomeric or polymeric compounds, acid salts as well as acid partial esters of the above-mentioned compounds. R and R' are particularly preferably selected independently of one another from the group comprising methyl, ethyl, propyl, isopropyl, butyl, isobutyl and tert-butyl radicals.

In a preferred embodiment it is a Brönsted-acidic phosphorus compound in which the phosphorus has oxidation state +3 or +5. Oxidation state +5 is particularly preferred.

Suitable as particularly preferred Brönsted-acidic phosphorus compounds are, for example, ortho-phosphoric acid, meta-phosphoric acid, oligo- and poly-phosphoric acids, phosphorous acid, methylphosphonic acid $CH_3P(O)(OH)_2$, acid salts of the above-mentioned compounds with monovalent and/or divalent metal cations, such as, for example, $NaH_2PO_4$, $Na_2HPO_4$, $KH_2PO_4$, $K_2HPO_4$, $Mg_{0.5}H_2PO_4$, $MgHPO_4$, $Ca_{0.5}H_2PO_4$, $CaHPO_4$, $Zn_{0.5}H_2PO_4$, $ZnHPO_4$, $NaH_2PO_3$, $KH_2PO_3$, $Mg_{0.5}H_2PO_3$, $Ca_{0.5}H_2PO_3$, $Za_{0.5}H_2PO_3$, as well as partial esters of the above-mentioned compounds, such as, for example, $P(O)(OH)(OR)(OR')$, $P(O)(OH)_2(OR)$, $HP(O)(OH)(OR)$ and $CH_3P(O)(OH)(OR)$, wherein R, R' are as defined above.

In a preferred embodiment, the Brönsted-acidic phosphorus compound is ortho-phosphoric acid or phosphorous acid, and in a particularly preferred embodiment it is ortho-phosphoric acid.

Component E

The composition can contain as component E commercially available polymer additives.

There are suitable as commercially available polymer additives according to component E additives such as, for example, flame retardants (for example phosphorus or halogen compounds), flame-retardant synergists (for example nano-scale metal oxides), smoke-inhibiting additives (for example boric acid or borates), antidripping agents (for example compounds of the substance classes of the fluorinated polyolefins, of the silicones as well as aramid fibres), internal and external lubricants and demoulding agents (for example pentaerythritol tetrastearate, Montan wax or polyethylene wax), flowability aids (for example low molecular weight vinyl (co)polymers), antistatics (for example block copolymers of ethylene oxide and propylene oxide, other polyethers or polyhydroxy ethers, polyether amides, polyester amides or sulfonic acid salts), conductivity additives (for example conductive black or carbon nanotubes), stabilisers (for example UV/light stabilisers, heat stabilisers, antioxidants, transesterification inhibitors, hydrolytic stabilisers), additives having antibacterial action (for example silver or silver salts), additives improving scratch resistance (for example silicone oils or hard fillers such as (hollow)

ceramics spheres), IR absorbents, optical brighteners, fluorescent additives, fillers and reinforcing materials (e.g. talc, optionally ground glass or carbon fibres, (hollow) glass or ceramics spheres, mica, kaolin, CaCO₃ and glass flakes) as well as colourings and pigments (for example carbon black, titanium dioxide or iron oxide) or mixtures of a plurality of the mentioned additives.

As flame retardants according to component E there are preferably used phosphorus-containing compounds. Such compounds are preferably selected from the groups of the monomeric and oligomeric phosphoric and phosphonic acid esters, phosphonate amines and phosphazenes, it also being possible to use as flame retardants mixtures of a plurality of components selected from one or various of those groups. Other halogen-free phosphorus compounds not mentioned specifically here can also be used on their own or in any desired combination with other halogen-free phosphorus compounds.

Preferred monomeric and oligomeric phosphoric and phosphonic acid esters are phosphorus compounds of the general formula (IV)

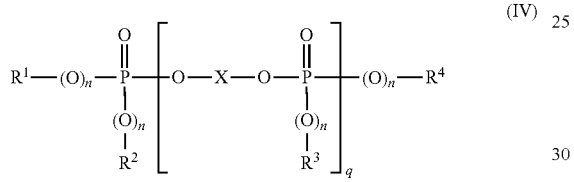

wherein

R¹, R², R³ and R⁴ independently of one another represent in each case optionally halogenated $C_1$- to $C_8$-alkyl, or $C_5$- to $C_6$-cycloalkyl, $C_6$- to $C_{20}$-aryl or $C_7$- to $C_{12}$-aralkyl each optionally substituted by alkyl, preferably $C_1$- to $C_4$-alkyl, and/or by halogen, preferably chlorine or bromine, each of the substituents n independently of the others represents 0 or 1, q represents from 0 to 30 and X represents a mono- or poly-nuclear aromatic radical having from 6 to 30 carbon atoms, or a linear or branched aliphatic radical having from 2 to 30 carbon atoms which can be OH-substituted and can contain up to 8 ether bonds.

R¹, R², R³ and R⁴ independently of one another preferably represent $C_1$- to $C_4$-alkyl, phenyl, naphthyl or phenyl-$C_1$-$C_4$-alkyl. The aromatic groups R¹, R², R³ and R⁴ can in turn be substituted by halogen and/or alkyl groups, preferably chlorine, bromine and/or $C_1$- to $C_4$-alkyl. Particularly preferred aryl radicals are cresyl, phenyl, xylenyl, propylphenyl or butylphenyl as well as the corresponding brominated and chlorinated derivatives thereof.

X in formula (IV) preferably represents a mono- or polynuclear aromatic radical having from 6 to 30 carbon atoms. It is preferably derived from diphenols of formula (I).

Each of the substituents n in formula (IV), independently of the others, can be 0 or 1; n is preferably 1.

q represents values from 0 to 30, preferably from 0.3 to 20, particularly preferably from 0.5 to 10, in particular from 0.5 to 6, most particularly preferably from 1.1 to 1.6.

X particularly preferably represents

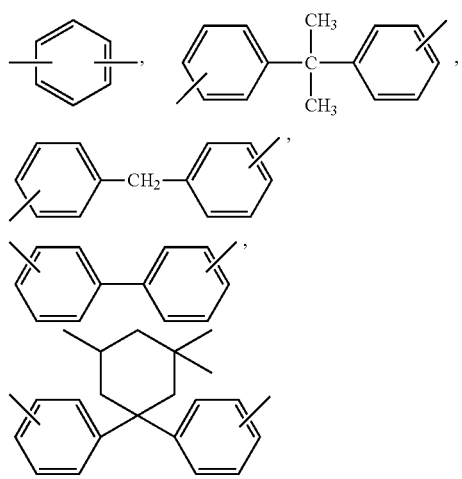

or chlorinated or brominated derivatives thereof; in particular X is derived from resorcinol, hydroquinone, bisphenol A or diphenylphenol. X is particularly preferably derived from bisphenol A.

It is also possible to use as component E according to the invention mixtures of different phosphates.

Phosphorus compounds of formula (IV) are in particular tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, resorcinol-bridged oligophosphate and bisphenol A-bridged oligophosphate. The use of oligomeric phosphoric acid esters of formula (IV) that are derived from bisphenol A is particularly preferred.

Most preferred as component E is bisphenol A-based oligophosphate according to formula (IVa)

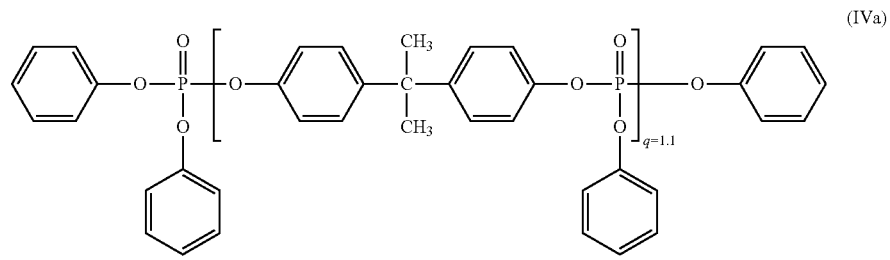

The phosphorus compounds according to component E are known (see e.g. EP-A 0 363 608, EP-A 0 640 655) or can be prepared according to known methods in an analogous manner (e g Ullmanns Enzyklopadie der technischen Chemie, Vol. 18, p. 301 ff 1979; Houben-Weyl, Methoden der organischen Chemie, Vol. 12/1, p. 43; Beilstein Vol. 6, p. 177).

When mixtures of different phosphorus compounds are used, and in the case of oligomeric phosphorus compounds, the indicated q value is the mean q value. The mean q value can be determined by determining the composition of the phosphorus compound (molecular weight distribution) by means of a suitable method (gas chromatography (GC), high pressure liquid chromatography (HPLC), gel permeation chromatography (GPC)) and calculating the mean values for q therefrom.

It is also possible to use phosphonate amines and phosphazenes, as are described in WO 00/00541 and WO 01/18105, as flame retardants.

The flame retardants can be used on their own or in an arbitrary mixture with one another or in admixture with other flame retardants.

In a preferred embodiment, the flame retardants are used in combination with polytetrafluoroethylene (PTFE) as anti-dripping agent.

The present invention relates further to the use of Brönsted acids of component D applied to component B for the stabilisation of polymer mixtures, containing basic impurities, containing at least one polymer prepared by polycondensation, during compounding and thermal shaping.

EXAMPLES

Component A-1
Linear polycarbonate based on bisphenol A having a weight-average molecular weight Mw of 28,000 g/mol (determined by gel permeation chromatography (GPC) in methylene chloride as solvent and with polycarbonate as standard).

Component B1
Pulverulent ABS graft polymer having a core-shell structure prepared by emulsion polymerisation, consisting of 40 wt. % styrene-acrylonitrile copolymer with a ratio of styrene to acrylonitrile of 72:28 wt. % as the shell on 60 wt. % of a particulate graft base of pure polybutadiene rubber having a mean particle size $d_{50}$ of 0.3 μm as the core.

Component B2 (Comparison)
Polycarbonate powder prepared by mechanical grinding of a linear polycarbonate based on bisphenol A having a weight-average molecular weight $M_w$ of 31,000 g/mol (determined by GPC in methylene chloride as solvent and with polycarbonate as standard).

Component C1
ABS blend with a ratio of acrylonitrile:butadiene:styrene of 21:15:64 wt. %, containing an ABS polymer prepared by emulsion polymerisation and worked up in a basic medium, an ABS polymer prepared by mass polymerisation and an SAN polymer.

Component C2
Blend of 35.62 parts by weight of component C1 and 2.97 parts by weight of component B1, wherein all of component B1 has been processed in a weight ratio of 1:1 with the corresponding part of the SAN polymer from component C1 to form a precompound in granulate form and is used as such in component C2.

Component D1
Aqueous phosphoric acid solution having a concentration of $H_3PO_4$ of 0.2 wt. %.

Component D2
Aqueous phosphoric acid solution having a concentration of $H_3PO_4$ of 2 wt. %.

Component D3
Aqueous phosphoric acid solution having a concentration of $H_3PO_4$ of 5 wt. %.

Component D4
Aqueous phosphoric acid solution having a concentration of $H_3PO_4$ of 10 wt. %.

Component D5
Concentrated phosphoric acid solution having a concentration of $H_3PO_4$ of 85 wt. %.

Component D6
Phosphorous acid ester of bis-(2-hydroxy-3-cyclohexyl-5-methyl-phenyl)-methane of the formula

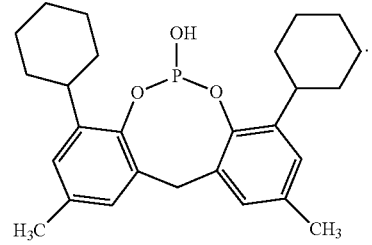

Component E1
Pentaerythritol tetrastearate as lubricant/demoulding agent

Component E2
Heat stabiliser, Irganox® B900 (mixture of 80% Irgafos® 168 and 20% Irganox® 1076; BASF AG; Ludwigshafen/ Irgafos® 168 (tris(2,4-di-tert-butyl-phenyl) phosphite)/Irganox® 1076 (2,6-di-tert-butyl-4-(octadecanoxycarbonyl-ethyl)-phenol) (Ludwigshafen, Germany)

Component E3
Heat stabiliser, Irganox 1076 (2,6-di-tert-butyl-4-(octadecanoxycarbonylethyl)-phenol), BASF (Ludwigshafen, Germany)

Preparation of the Moulding Compositions
In the first process step (i), a physical mixture consisting of components B and D was prepared using a LAB CM 3-12-MB laboratory container mixer from Mixaco Dr. Herfeld GmbH & Co. KG Maschinenfabrik (Neuenrade, Germany). Components E1 to E3 of the particular composition in question were added to the mixture and mixing was again carried out using the Mixaco mixer.

In the second process step (ii), the pourable powder mixture resulting from process step (i) was introduced by way of a separate metering hopper, together with components A and C, which were likewise metered by way of separate metering hoppers, into the intake zone of a ZSK25 twin-shaft extruder from Coperion GmbH (Stuttgart, Germany). The resulting mixture was brought to a temperature of 260° C. in the melting and kneading zone of the extruder and thereby melted, kneaded at that temperature, and the plasticised components were thus dispersed in one another. The mixture so compounded was degassed in the subsequent degassing zone of the extruder by application of a low pressure of 100 mbar (absolute) to the melt, and the water introduced into the mixture by way of component D was thus removed from the polymer alloy again. The water vapour thereby at the same time also acts as carrier gas for removing volatile organic compounds (VOCs) such as, for example, residual monomers and residual solvents from the polymer raw materials used (components A, B and C). The degassed melt was then discharged from the extruder by way of a die, the resulting melt strand was passed for cooling through a water bath at a temperature of about 30° C., and the solidified polymer strand was subsequently granulated by means of a strand granulator.

Production of the Test Specimens and Testing

The granulates resulting from each compounding were processed on an injection-moulding machine (Arburg) at a melt temperature of 260° C. and 300° C. and a tool temperature of 80° C. to form test specimens measuring 80 mm×10 mm×4 mm and 60 mm×40 mm×2 mm The iMVR serves as a measure of the polycarbonate molecular weight degradation to be expected at elevated processing temperatures, and accordingly of the heat stability of the composition, and is determined according to ISO 1133 at a melt temperature of 300° C. with a plunger load of 5 kg after a holding time at that temperature of 300° C. of 15 minutes.

The natural colour/inherent colour is measured in reflection according to DIN 6174 on sheets measuring 60 mm×40 mm×2 mm, which were produced by injection moulding at a melt temperature of 260° C. and 300° C. The yellowness index YI is calculated according to ASTM E313.

The gloss level is determined on sheets measuring 60 mm×40 mm×2 mm, which were produced by injection moulding at a melt temperature of 260° C. and 300° C. Measurement is carried out in reflection at measuring angles of 20° and 60° according to DIN 67530.

The relative change in the gloss levels measured at measuring angles of 20° and 60° with an increase in the melt temperature from 260° C. to 300° C. in the injection moulding is used as a measure of the processing stability and is calculated according to:

Change in gloss level (260° C.→300° C.)=100%· (gloss level at 300° C.−gloss level at 260° C.)/ gloss level at 260° C.

The change in gloss level is determined separately for the two measuring angles.

The tendency to form processing streaks as a measure of the heat stability is likewise determined visually on those sheets measuring 60 mm×40 mm×2 mm, which were produced by injection moulding at a melt temperature of 300° C.

The notched impact strength ($a_k$) is determined according to ISO 180/1A by a 10-fold determination on test rods measuring 80 mm×10 mm×4 mm, which were produced by injection moulding at a melt temperature of 300° C. in order to simulate processing at elevated processing temperatures. Measurement is carried out at temperatures of 23° C., 10° C., 0° C., −10° C., −20° C. and −30° C.

The $a_k$ ductile-brittle transition temperature is determined from the resulting measured data as the temperature at which in each case 50% of the individual measurements exhibit a measured value for the notched impact strength of greater than and less than 30 kJ/m$^2$.

The elongation at tear is determined in accordance with ISO 527-1, -2 on shouldered rods measuring 170 mm×10 mm×4 mm, which were produced by injection moulding at a melt temperature of 300° C. in order to simulate processing at elevated processing temperatures.

As a measure of the hydrolytic stability of the compositions there is used the change in the MVR measured according to ISO 1133 at 260° C. with a plunger load of 5 kg on storage of the granulate for 7 days under moist and warm conditions ("FWL storage") at 95° C. and 100% relative humidity. The relative increase in the MVR value compared with the MVR value before the corresponding storage is calculated as ΔMVR(hydr.), which is defined by the following formula:

$$\Delta MVR(hydr) = \frac{MVR(\text{after } FWL \text{ storage}) - MVR(\text{before storage})}{MVR (\text{before storage})} \cdot 100\%.$$

The stress cracking resistance under the influence of media (environmental stress cracking=ESC) is determined in accordance with ISO 4599 on test rods measuring 80 mm×10 mm×4 mm, which were produced by injection moulding at 300° C. in order to simulate processing at elevated processing temperatures. As a measure of the stress cracking resistance there is used the time to rupture failure of the test specimens, which were stressed by means of a tension plate with an external outer fibre strain of 2.4% and immersed completely in rape oil as the medium.

TABLE 1

| | C1 | C2 | 1 | C3 | 2 | 3 | 4 | C4 | C5 |
|---|---|---|---|---|---|---|---|---|---|
| Material used | Parts | Parts | Parts | Parts | Parts | Parts | Parts | Parts | Parts |
| A1 | 60.35 | 60.35 | 60.35 | 57.38 | 60.35 | 60.35 | 60.35 | 60.35 | 60.35 |
| C1 | 35.62 | 35.62 | 35.62 | | 35.62 | 35.62 | 35.62 | 35.62 | 35.62 |
| C2 | | | | 38.59 | | | | | |
| B1 | 2.97 | 2.97 | 2.97 | | 2.97 | 2.97 | 2.97 | 2.97 | 2.97 |
| B2 | | | | 2.97 | | | | | |
| E1 | 0.74 | 0.74 | 0.74 | 0.74 | 0.74 | 0.74 | 0.74 | 0.74 | 0.74 |
| D6 | 0.12 | | | | | | | | |
| E2 | | 0.12 | 0.12 | 0.12 | 0.12 | 0.12 | 0.12 | 0.12 | 0.12 |
| E3 | 0.2 | 0.2 | 0.2 | 0.2 | 0.2 | 0.2 | 0.2 | 0.2 | 0.2 |
| D1 | | | | | | | | | 0.5 |
| D2 | | | 0.5 | 0.5 | | | | | |
| D3 | | | | | 0.2 | | | | |
| D4 | | | | | | 0.1 | | | |
| D5 | | | | | | | 0.012 | 0.5 | |
| calculated: effective H3PO4 content | — | 0 | 0.01 | 0.01 | 0.01 | 0.01 | 0.01 | 0.425 | 0.001 |
| Testing | | | | | | | | | |
| iMVR(300° C./15 min) [ml/10 min] | 64 | 120 | 58 | 56 | 56 | 57 | 59 | >>200* | 75 |
| Yellowness Index (260° C.) | 22 | 11 | 17 | 20 | 16 | 16 | 17 | 31 | 14 |
| Yellowness Index (300° C.) | 26 | 16 | 22 | 23 | 20 | 21 | 21 | 33 | 18 |
| Gloss level (20°/260° C.) | 86 | 95 | 95 | 81 | 96 | 92 | 94 | 83 | 92 |

TABLE 1-continued

|  | C1 | C2 | 1 | C3 | 2 | 3 | 4 | C4 | C5 |
|---|---|---|---|---|---|---|---|---|---|
| Gloss level (20°/300° C.) | 72 | 66 | 65 | 64 | 69 | 62 | 67 | 35 | 80 |
| Gloss level (60°/260° C.) | 97 | 101 | 101 | 97 | 102 | 100 | 100 | 97 | 100 |
| Gloss level (60°/300° C.) | 92 | 92 | 93 | 93 | 94 | 89 | 92 | 71 | 96 |
| Heat stability (300° C.)—streaks | yes | yes | no | no | no | no | no | many | no |
| ak (23° C.) [kJ/m2] | 43 | 33 | 45 | 44 | 44 | 43 | 44 | 39 | 43 |
| ak (−30° C.) [kJ/m2] | 18 | 11 | 18 | 18 | 19 | 18 | 19 | 14 | 17 |
| ak ductile-brittle transition temperature [° C.] | −15 | 10 | −15 | −15 | −15 | −15 | −15 | −5 | −15 |
| Elongation at tear [%] | 106 | 83 | 126 | 125 | 110 | 101 | 124 | 106 | 117 |

*not measurable because viscosity too low

The data in Table 1 show that Examples 1 to 4 according to the invention, in which the acidic phosphorus compound is applied to the graft polymer B in an effective concentration of 0.01 wt. % (100 ppm) in the form of an aqueous solution, have an advantageous combination of processing stability, measured by streaking, polycarbonate molecular weight degradation as well as natural colour and gloss level stability at high processing temperatures, mechanical properties, measured by the notched impact strength as a function of temperature, and elongation at tear, hydrolytic and stress cracking stability. If the effective concentration of the acidic phosphorus compound used is too low or if the acidic phosphorus compound is omitted altogether (compare Example 1 with Comparison Examples C2 and C5), an only slightly better natural colour is obtained, but the processing stability, in particular in relation to the PC degradation observed at high processing temperatures, and the stress cracking resistance suffer significantly. If the acidic phosphorus compound is omitted altogether (compare Example 1 with Comparison Example C2), the mechanical parameters such as notched impact strength, ductile-brittle transition temperature and elongation at tear are also adversely affected. On the other hand, the use of the acidic phosphorus compound in too high an effective concentration (compare Example 1 with Comparison Example 4) likewise leads to a deterioration of the processing stability in relation to the PC degradation observed at high processing temperatures, the formation of processing streaks and the fall in the stress cracking resistance, but also results in a considerable impairment of the natural colour, the hydrolytic stability, the notched impact strength and the gloss level as well as the stability thereof to the processing temperature. If the acidic phosphorus compound is used in the form of a meterable solid (Comparison Example 1), comparatively high active ingredient concentrations are required in order to achieve adequate processing stability. This leads to an impairment in particular of the natural colour and of the hydrolytic stability. If the acidic phosphorus compound in the form of an aqueous solution is applied in the advantageous effective acid concentration of 0.01 wt. % but not to the graft polymer B but to a pulverulent polycarbonate ground material as the carrier component (compare Example 1 with Comparison Example C3), there are obtained in particular a disadvantageous natural colour and a lower gloss level at moderate processing temperatures.

The data in Table 1 additionally show that it is particularly advantageous to introduce the acidic phosphorus compound into the composition in the form of a highly dilute aqueous solution applied to the graft polymer B (compare Examples 1 and 2 with 3 and 4). If a concentrated solution of the acidic phosphorus compound is used (Example 4), the stress cracking resistance suffers significantly; in the middle concentration range (Example 3), on the other hand, the elongation at tear is adversely affected. In a particularly preferred embodiment, therefore, the acidic phosphorus compound is used in the process according to the invention in the form of an aqueous solution having an active ingredient concentration of less than 10 wt. %.

The invention claimed is:

1. A process for preparing an impact-modified polymer composition comprising
   A) from 10 to 98 parts by weight, based on the sum of components A+B+C+D+E, of at least one polymer selected from the group consisting of aromatic polycarbonates, aromatic polyester carbonates and aromatic polyesters, as well as mixtures thereof,
   B) from 0.5 to 50.0 parts by weight, based on the sum of components A+B+C+D+E, of at least one pulverulent rubber-modified vinyl (co)polymer,
   C) from 0 to 80 parts by weight, based on the sum of components A+B+C+D+E, of at least one component selected from the group consisting of rubber-modified vinyl (co)polymers in granulate form and rubber-free vinyl (co)polymers,
   D) from 0.002 to 0.200 part by weight, based on the sum of components A+B+C+D+E, of at least one Brönsted acid,
   E) from 0.1 to 40.0 parts by weight, based on the sum of components A+B+C+D+E, of one or more additives, with the exception of the Brönsted acid according to component D,
   wherein the sum of the parts by weight of components A+B+C+D+E in the impact-modified polymer composition is 100,
   the process comprising:
   (i) preparing a solution comprising the at least one Brönsted acid of component D with a concentration of from 0.3 to 30 wt. % in a solvent,
   (ii) physically blending the solution comprising the at least one Brönsted acid from (i) with the total amount or a partial amount of the at least one pulverulent rubber-modified vinyl (co)polymer of component B to form a mixture, wherein the solution comprising the at least one Brönsted acid is present in the mixture in an amount, based on the sum of components B and D in the mixture, of not more than 30 parts by weight, and
   (iii) melting, mixing and dispersing in one another the mixture from (ii) with the further and/or residual components A-E of the impact-modified polymer composition, which have optionally been premixed, in a compounding unit to produce the impact-modified polymer composition in the form of a polymer melt,
   wherein the solvent that has been added to the impact-modified polymer composition by the solution comprising the at least one Brönsted acid is removed in a degassing zone of the compounding unit by application of an absolute pressure of not more than 800 mbar, and wherein the polymer melt solidified by cooling and then granulated.

2. The process according to claim 1, wherein in (ii), in addition to the solution comprising the at least one Brönsted acid, one or more additives of component E are also mixed with component B, wherein the one or more additives mixed with component B comprise one or more stabilizers.

3. The process according to claim 1, wherein in (ii), component B and the solution comprising the at least one Brönsted acid are first mixed, before one or more further pulverulent components are added.

4. The process according to claim 1, wherein the amount of component B physically blended in (ii) is not more than 10 parts by weight, based on the total composition.

5. The process according to claim 1, wherein the amount of component B physically blended in (ii) is from 1.5 to 5.0 parts by weight, based on the total composition.

6. The process according to claim 1, wherein the solution comprising the at least one Brönsted acid is used in the mixture prepared in (ii) in an amount, based on the sum of components B and D therein, of not more than 20 parts by weight.

7. The process according to claim 1, wherein the solvent in (i) is an inorganic solvent.

8. The process according to claim 1, wherein the solvent in (i) is water.

9. The process according to claim 1, wherein the impact-modified polymer composition comprises
from 55 to 65 parts by weight of said component A,
from 1.5 to 5.0 parts by weight of said component B,
from 20 to 40 parts by weight of said component C,
from 0.007 to 0.020 part by weight of said component D,
from 0.5 to 3.0 parts by weight of one or more additives, with the exception of said acid that is added in component D, of component E, and
wherein the sum of the parts by weight of components A+B+C+D+E in the composition is 100.

10. The process according to claim 1, wherein in (i) the solution comprising the at least one Brönsted acid is prepared with a concentration of from 1 to 6 wt. % in the solvent.

11. The process according to claim 1, wherein the at least one Brönsted acid is selected from the group consisting of Brönsted-acidic phosphorus compounds in which the phosphorus has oxidation state +3 or +5.

12. The process according to claim 1, wherein the at least one Brönsted acid comprises is ortho-phosphoric acid.

* * * * *